US012701165B2

(12) United States Patent
Roach et al.

(10) Patent No.: US 12,701,165 B2
(45) Date of Patent: Aug. 4, 2026

(54) INTELLIGENT COHORTS FOR NETWORK CONTENT DELIVERY

(71) Applicant: NETSWEEPER (BARBADOS) INC., St. Michael (BB)

(72) Inventors: Perry J. Roach, Waterloo (CA); Geoffrey Wells, Waterloo (CA); John Alexander Robb, Waterloo (CA)

(73) Assignee: NETSWEEPER (BARBADOS) INC., St. Michael (BB)

( * ) Notice: Subject to any disclaimer, the term of this patent is extended or adjusted under 35 U.S.C. 154(b) by 0 days.

(21) Appl. No.: 18/706,280

(22) PCT Filed: Nov. 2, 2022

(86) PCT No.: PCT/IB2022/060571

§ 371 (c)(1),
(2) Date: Apr. 30, 2024

(87) PCT Pub. No.: WO2023/079464

PCT Pub. Date: May 11, 2023

(65) Prior Publication Data

US 2024/0422226 A1      Dec. 19, 2024

Related U.S. Application Data

(60) Provisional application No. 63/274,823, filed on Nov. 2, 2021.

(51) Int. Cl.
| | |
|---|---|
| *G06F 15/16* | (2006.01) |
| *H04L 45/80* | (2022.01) |
| *H04L 67/1396* | (2022.01) |

(52) U.S. Cl.
CPC .......... *H04L 67/1396* (2022.05); *H04L 45/80* (2022.05)

(58) Field of Classification Search
CPC .... H04L 67/1396; H04L 45/80; H04L 67/306
See application file for complete search history.

(56) References Cited

U.S. PATENT DOCUMENTS

| | | | | |
|---|---|---|---|---|
| 11,887,119 B1 * | 1/2024 | Campbell | .......... | G06Q 20/3821 |
| 2008/0270417 A1 * | 10/2008 | Roker | ................ | G06Q 30/0269 |

(Continued)

FOREIGN PATENT DOCUMENTS

| | | |
|---|---|---|
| EP | 3082320 B1 | 7/2020 |
| WO | WO-2006081680 A1 | 8/2006 |

(Continued)

*Primary Examiner* — Razu A Miah
(74) *Attorney, Agent, or Firm* — Perry + Currier Inc.

(57) ABSTRACT

To create or update a cohort comprising a weighted content category group that reflect usage behavior of a user group, a data packet in transit between a user device and a host through an internet service provider (ISP) core network is intercepted. The data packet is assigned to a category of content and analyzed to obtain a user identifier associated with the data packet. An identity graph of a user associated with the user identifier is updated based on the category of content. The identity graph tracks accesses to different categories of content. The cohort belongs to a set of cohorts configured to be queried to determine a particular cohort corresponding to a particular user identifier for delivering content associated with the particular cohort to a particular user represented by the particular user identifier.

15 Claims, 4 Drawing Sheets

(56)                    References Cited

U.S. PATENT DOCUMENTS

| | | | |
|---|---|---|---|
| 2010/0057926 A1 | 3/2010 | Cao et al. | |
| 2011/0184886 A1* | 7/2011 | Shoham | G06Q 30/0283 |
| | | | 705/400 |
| 2011/0276396 A1* | 11/2011 | Rathod | G06F 16/2428 |
| | | | 707/706 |
| 2011/0280216 A1* | 11/2011 | Li | H04L 65/80 |
| | | | 370/331 |
| 2016/0165514 A1* | 6/2016 | Lou | H04L 5/0007 |
| | | | 370/328 |
| 2016/0275528 A1* | 9/2016 | Gardenswartz | H04L 51/56 |
| 2017/0148063 A1* | 5/2017 | Ung | H04W 4/33 |
| 2017/0302627 A1* | 10/2017 | Lai | G06Q 30/0269 |
| 2018/0152818 A1* | 5/2018 | Mills | G06Q 30/0267 |
| 2019/0026212 A1* | 1/2019 | Verkasalo | H04L 67/535 |
| 2019/0172096 A1* | 6/2019 | Tenant de la Tour | H04W 4/14 |
| 2019/0228409 A1* | 7/2019 | Madisetti | G06Q 40/03 |
| 2020/0311790 A1* | 10/2020 | Keren | G06Q 20/4016 |
| 2021/0192078 A1* | 6/2021 | Cosman | G06F 21/6254 |
| 2021/0241292 A1* | 8/2021 | Pandey | G06N 3/044 |
| 2021/0256833 A1* | 8/2021 | Daoura | H04W 4/021 |

FOREIGN PATENT DOCUMENTS

| | | | |
|---|---|---|---|
| WO | WO-2017042713 A1 | 3/2017 | |
| WO | WO-2021064754 A2 | 4/2021 | |

* cited by examiner

INTELLIGENT COHORTS FOR NETWORK CONTENT DELIVERY

BACKGROUND

Tracking user behavior on computer-network devices, so as to enable the delivery relevant content, is a growing area of technological development. Accuracy and privacy are two prime concerns that are often in tension.

It is important to consider privacy when tracking user behavior. People have widely varying opinions about whether they want to have their behavior tracked and to what degree tracking should be done. As well, there are various legal requirements to comply with in various different jurisdictions. People may recognize the benefits of allowing some tracking, such as delivery of content of greater relevance. At the same time, people may be suspicious of or dislike tracking for privacy reasons. The present invention seeks to strike a balance that is beneficial to all parties, such as end users and the content providers or merchants.

One technological problem with providing accurate and privacy-respecting tracking is that often there is a multitude of computer-based identities associated with a given person. Social media accounts, online stores, and similar computerized services tend to use their own account identifiers and service policies. If one service respects a user's privacy and delivers accurate content, there is no assurance that a different service will do the same. The end user is often forced to configure each service individually.

SUMMARY

According to various aspects of the present invention, a non-transitory machine-readable medium includes instructions that, when executed by a processor, cause the processor to intercept a data packet in transit between a user device and a host through an internet service provider (ISP) core network, assign the data packet to a category of content. The instructions analyze the data packet to obtain a user identifier associated with the data packet. The user identifier uniquely identifies a user of the user device. The instructions update an identity graph of the user based on the category of content. The identity graph tracks accesses to different categories of content by the user device. The instructions create or update a cohort of different users using identity graphs of the different users. The cohort belongs to a set of cohorts that are associated with user identifiers. The set of cohorts is queryable to determine a particular cohort to which a particular user identifier belongs to enable delivery of content associated with the particular cohort to a particular user represented by the particular user identifier.

The instructions may further update the cohort by applying the identity graphs to an artificial intelligence system.

The instructions may further create the cohort by applying the identity graphs to an artificial intelligence system.

The instructions may further determine outcomes of communications between the different user devices and different hosts and update the cohort or create a new cohort by applying the identity graphs and the outcomes to an artificial intelligence system.

The outcomes may include one or more of a sale of a good or service, following a hyperlink, engaging with content, viewing an advertisement, creating or renewing a subscription, creating or logging into an account.

The instructions may further obtain the user identifier of the data packet by extracting the user identifier from the data packet or selecting the user identifier from a set of user identifiers using identifying information in the data packet.

The identifying information may include one or more of an internet protocol (IP) address, a third-party user identifier, a hardware identifier of the user device, and a fingerprint of the user device.

The instructions may further assign the data packet to the category of content by categorizing content at a host that is associated with the packet.

A computing device may include the non-transitory machine-readable medium and a processor to execute the instructions.

According to various aspects of the present invention, a method includes intercepting a data packet in transit between a user device and a host through an internet service provider (ISP) core network, assigning the data packet to a category of content, and analyzing the data packet to obtain a user identifier associated with the data packet. The user identifier uniquely identifies a user of the user device. The method includes updating an identity graph of the user based on the category of content. The identity graph tracks accesses to different categories of content by the user device. The method includes creating or updating a cohort of different users using identity graphs of the different users. The cohort belongs to a set of cohorts that are associated with user identifiers. The set of cohorts is queryable to determine a particular cohort to which a particular user identifier belongs to enable delivery of content associated with the particular cohort to a particular user represented by the particular user identifier.

The method may further include updating the cohort by applying the identity graphs to an artificial intelligence system.

The method may further include creating the cohort by applying the identity graphs to an artificial intelligence system.

The method may further include determining outcomes of communications between the different user devices and different hosts and updating the cohort or creating a new cohort by applying the identity graphs and the outcomes to an artificial intelligence system.

The method may further include obtaining the user identifier of the data packet by extracting the user identifier from the data packet or selecting the user identifier from a set of user identifiers using identifying information in the data packet.

A computing device may be configured to perform the method.

DETAILED DESCRIPTION

Figure 1:
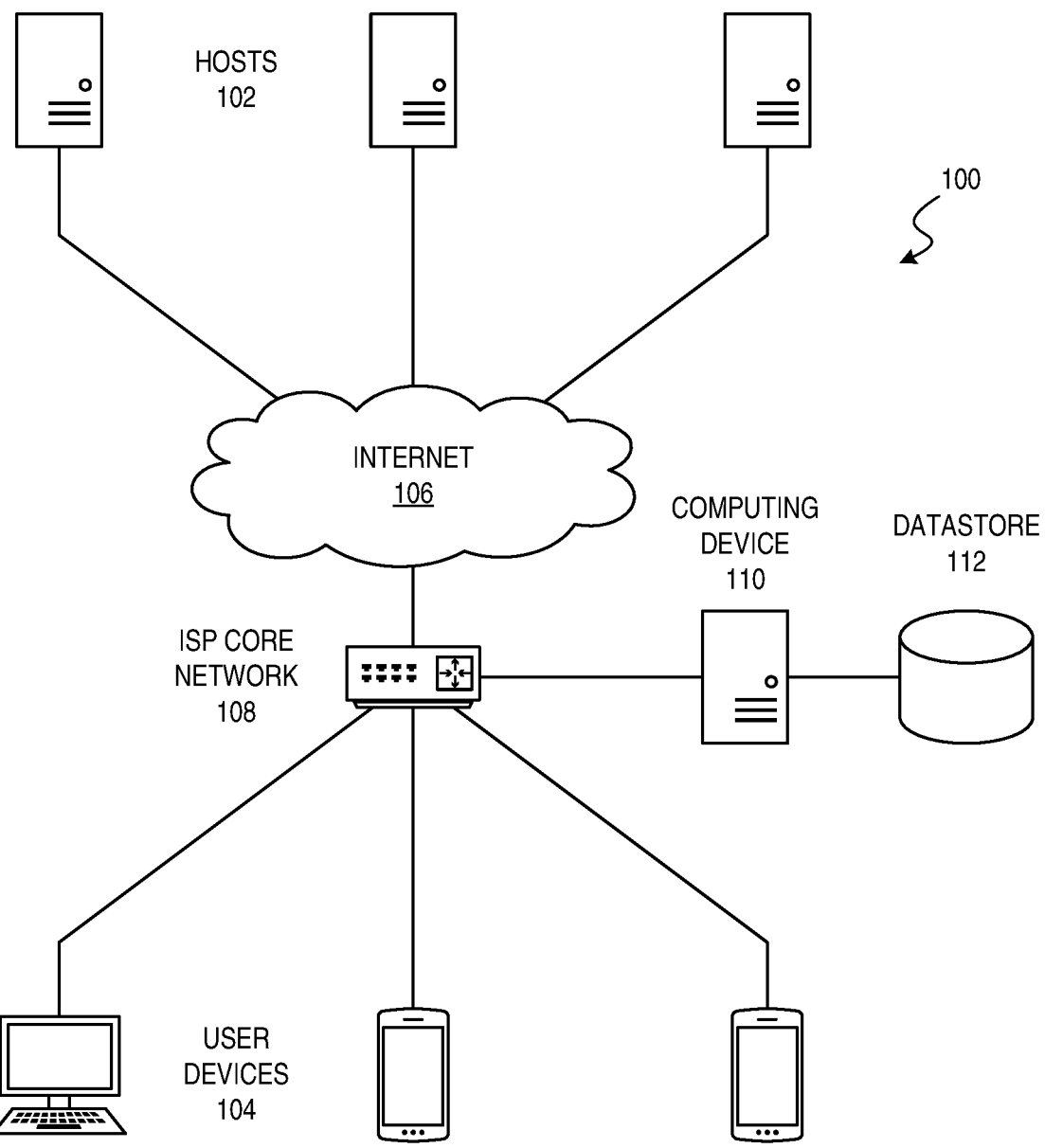
FIG. 1 is a diagram of a computer system according to the present invention.

One approach to tracking user behavior on network devices includes running code directly on a user device and use tracking identifiers that the user device passes with requests to specific services and hosts. This approach is limited in that it depends on the software on the device to pass on the information and as such may be compromised on not delivered at all. Additionally, only services that are used or have sharing relationships will be able to provide tracking information limiting the ability to create a 360-degree view of the user's activity.

The present invention creates network-level intelligence with behavior forecasting using network-level data to identify, track, and predict future behavior. It does this by inspecting network packets in an IP based network, relating data streams to specific devices, and factoring in the destination, amount of usage, time of day and other factors to build a profile of the user. This network-level approach is different from the typical service-level approach where a user must configure preferences for each individual service they use (e.g., each social network and online store). The present invention may be implemented at an ISP or with an ISP's cooperation to help ensure that local laws and practices are respected.

A network-level user profile can be used to forecast future behavior to recommend content consistent with the profile without needing to access or compromise the user's device. Profile information can be used for advertising or content delivery that is tailored to what the user desires. Use of a profile in this way includes the blocking or mitigation of certain content, such as for example malware or phishing websites or services that do not respect the user's privacy.

The invention solves problems with current approaches in that the invention does not require specialized software to be installed on user devices, can control the distribution of personal information by limiting knowledge about unique identities, and can function across devices and services, thereby linking usage data from different devices and services to a specific user.

The approach to creating user profiles through network intelligence and providing that information to content delivery systems while preserving personal information is achieved through a pipeline that categorizes all network traffic based on destination and maps categorized traffic against unique user identifiers. Artificial Intelligence (AI) may be used to create and update cohorts which are used to select appropriate content to deliver to the user based on compatibility scores. Selecting content to deliver includes blocking content as well.

In various examples, an identity graph is maintained for each user based on categories of content accessed. The identity graph tracks accesses to different categories of content by the user's device. A cohort of different users is updated or created using identity graphs of the different users. The cohort belongs to a set of cohorts that are associated with user identifiers. The set of cohorts is queryable to determine a particular cohort to which a particular user identifier belongs to enable delivery of content associated with the particular cohort to a particular user represented by the particular user identifier.

Outcomes may be returned to the system and used to retrain the AI based on success ratings qualified relative to a best case. Outcomes include use cases such as click through rates, conversions, purchase value, length of engagement on content, ad revenue, or other factors such as positive reinforcement content for employees or threat prevention for students.

In addition, it should be noted that large online social networks, online merchant services, and similar wider services, which often operate in multiple jurisdictions, rely on local Internet Service Providers (ISP). Users gain access to such wider online service via their ISPs. ISPs provide the hardware and infrastructure for access to wider online services and are limited by the laws and practices of the jurisdictions in which they operate, whereas wider online services may avoid such constraints or merely treat them as formalities. The present invention may be implemented at an ISP or with an ISP's cooperation to help ensure that local laws and practices are respected. For example, a user may be assigned to a cohort that is used to block (or direct traffic away from) wider online services that fail to comply with the relevant laws and practices of the user's jurisdiction.

FIG. 1 shows an example system 100 to implement the present invention. The system 100 includes a plurality of hosts 102 that provide content (e.g., information, data, media, services, e-commerce, etc.) to a plurality or user device 104. Hosts 102 may be termed servers or services. User devices 104 may include computing device, such as notebook computers, desktop computers, smartphones, smart watches, tablet computers, and the like. The user devices 104 may communicate with the hosts 102 via the internet 106. The user devices 104 may be provided access to the internet by ISP 108.

A computing device 110 and datastore 112 may be connected to ISP 108 core network infrastructure to implement the techniques discussed herein. In various examples, the computing device 110 has access to all network traffic between the user devices 104 and hosts 102. Any number and configuration of computing devices 110 and datastores 112 may be used. Certain functions may be assigned to certain computing devices 110 and datastores 112. An additional computing device 110 or datastore 112 may provide redundancy. For sake of explanation, this disclosure will reference an example computing device 110 and datastore 112.

The computing device includes a processor capable of executing instructions to implement the techniques discussed herein. Example processors include a central processing unit (CPU), a field-programmable gate array (FPGA), and an application-specific integrated circuit (ASIC). Instructions and related data may be stored in a non-transitory machine-readable medium, which may be volatile or non-volatile. Examples of such a medium include random-access memory (RAM), read-only memory (ROM), electrically-erasable programmable read-only memory (EEPROM), flash memory, a hard disk drive (HDD), a solid-state drive (SSD), and other electronic, magnetic, or optical physical media.

Instructions may be directly executed, such as binary or machine code, and/or may include interpretable code, byte-code, source code, or similar instructions that may undergo additional processing to be executed. All of such examples may be considered executable instructions. A set of instructions for a particular purpose may be referred to as an agent.

Processing may be arranged in a pipeline where each step represents unique implementation requirement. The complete pipeline results in a specific novel approach to processing behavioral information. The major stages stated below with the specifics of each stage in the pipeline are presented in the following sections.

Figure 2:
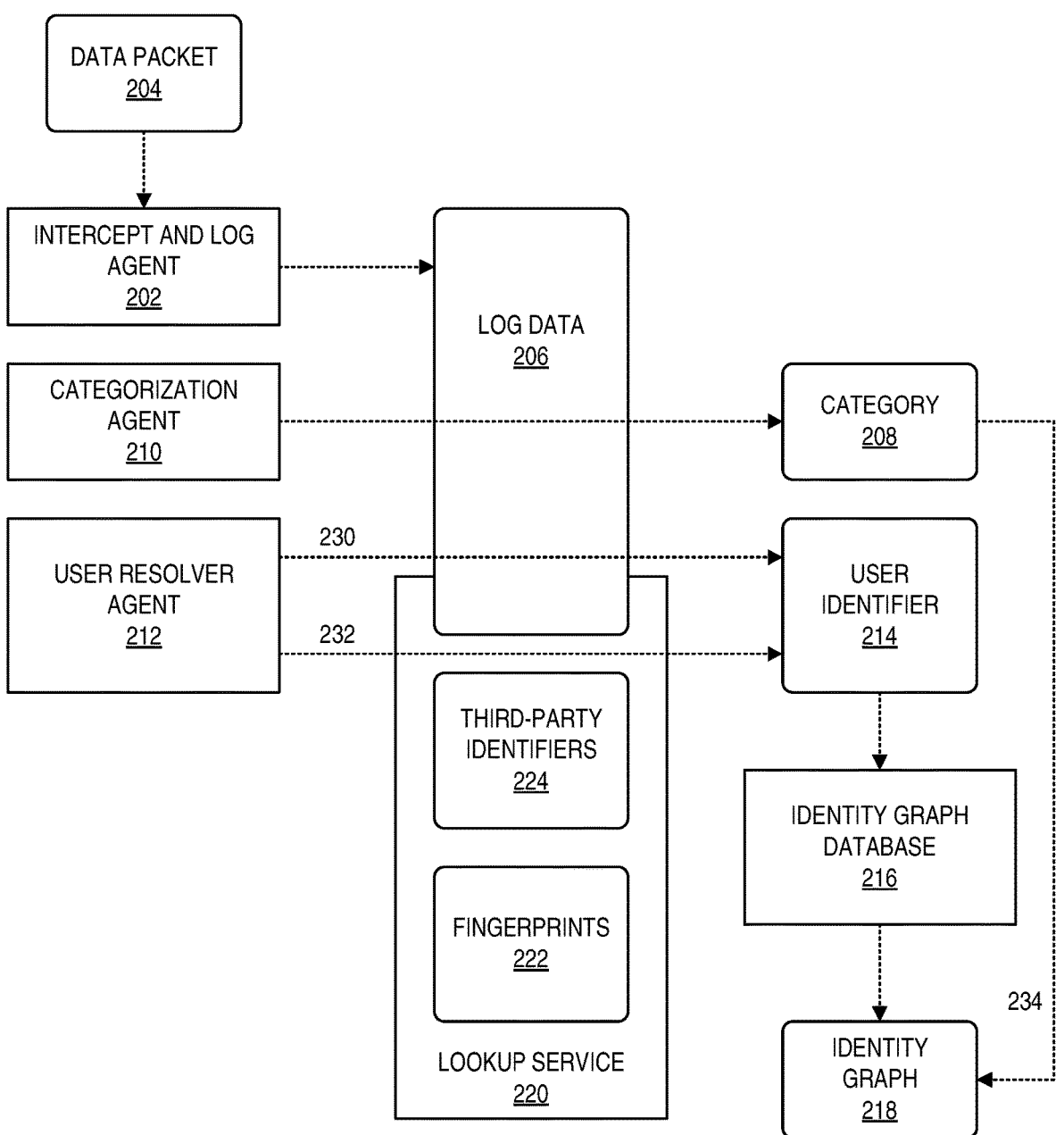
FIG. 2 is a diagram of obtaining an identity graph for a user based on a user's unique identifier according to the present invention.

1. Network Access Tracking and Content Categorization
    2. Unique User Identification
    3. Identity Graph Creation and Management
    4. Cohort Creation and Management
    5. Cohort Requests and Outcome Tracking
    6. Performance and Scaling Specifics Network Access Tracking and Content Categorization The computing device 110 intercept a data packet in transit between a user device 104 and a host 102 through the ISP 108 core network. The computing device 110 may operate an intercept and log agent 202 (FIG. 2) to intercept packets 204 and log related data 206 of the packets 204.

The computing device 110 may collect data via existing network infrastructure (routers or other capable devices) at the ISP 108. The ISP's infrastructure may be configured to send a copy of all network packets to an agent running on the computing device 110. The original packet will continue onto the intended destination but a copy will be sent to the agent for analysis and logging.

The computing device 110 captures and logs relevant information from each network packet. If the packet is encrypted, and the appropriate capabilities exist at the computing device 110 (e.g., master keys, client agent decryption or other decryption) the information will be decrypted to allow data extraction. If decryption cannot be done, the largest subset of the information described below that is exposed will be collected.

In various examples, a client program may be provided to a user device 104. Such a client program may be configured to decrypt data packets and share decrypted information with the computing device 110. The user of the user device 104, or the organization to which the device 104 belongs, authorizes decryption by installing the client program and/or providing access to the necessary cryptographic keys. A client program is not strictly necessary to carry out the present invention, but is useful to increase comprehension of content requested and delivered.

For a given packet, the computing device 110 may first assess the packet to determine if it represents the initiation of a new request from a user device 104 to a host 102. If the packet does represent a new request, the computing device 100 may log a source IP address, destination IP address, packet time to live, and the time and date. Where possible (e.g., if the network protocol is one that can be inspected), additional information may be captured such as the resource path (URL/URI) as well as attributes of the user device 104 such as screen size, operating system and version, the client application and version and any additional third-party unique identifiers that can be used for tracking (such as third-party cookies).

The computing device 110 assigns the data packet to a category 208 of content. This may include categorizing content at the host 102 that is associated with the packet.

The destination IP and resource path may be provided to a categorization agent 210 (FIG. 2), which may be executed by the computing device 110, to provide a set of category identifiers for the applicable categories of the destination IP address and resource identifier.

Logged data 206 for a given packet 204 may include:
Source IP Address
Destination IP Address
Time to Live
Date/Time
Category
URL/URI
User Identifier
Operating System and version
Device Type
Display Attributes
Third-party Unique Identifiers
Unique User Identification The computing device 110 may analyze the data packet to obtain a user identifier of the data packet. The user identifier uniquely identifies a user of the user device 104. Analyzing a data packet 204 may be achieved by processing the log data 206. The computing device 110 may extracting a user identifier from a data packet by processing the relevant log data 206 for that packet. The user identifier may be explicitly present in the log data 206. When not explicitly present, a user identifier may be selected from a set of known user identifiers based on identifying information, such as third-party identifiers and/or hardware/software fingerprints, explicitly present in or derived from the log data 206 for the data packet 204.

For example, once a packet data has been logged, a user resolver agent 212 (FIG. 2) executed by the computing device 110 may process the information, assign it a unique user identifier, and store the results in the datastore 112. Each entry in the log may be treated as a single request made by the device and used to increment category counters in an identity graph (discussed below) associated with the user identifier.

The user resolver agent 212 may analyze a data packet and identify the unique user identifier 214 for the data packet using the following process:

1. Determine if there is a user identifier in the packet. If so, the process may be stopped;
2. Attempt to match the IP address of the packet to a database of network access information provided by the ISP 108;
3. Attempt to find third-party unique identifiers in the packet and, if found, attempt to resolve a found third-party unique identifier to a user identifier; and
4. Compute a fingerprint for the user device, and attempt to resolve the hardware identifier to a user identifier.

If a user identifier 214 is obtained, it can be used as a direct lookup into an identity graph database 216 to obtain the related identity graph 218. This would more normally be captured as a cookie in a HTTP stream but could be encapsulated differently depending on the protocol in question. If an identity graph 218 exists for the user identifier 214, the user resolver agent 212 may update the identity graph 218.

As discussed above, a user identifier 214 may not be explicitly present in the packet data. Accordingly, a lookup service 220 may be used. The lookup service 220 may be configured as discussed below.

An IP address-to-user identifier lookup service, if available, may be used to obtain a user identifier based on IP address and network operator authentication information. Given this information may not be timely and unable to respond quickly enough to the high volume of requests contemplated, a service may need to be specifically configured to handle these lookups. If this service was unavailable, user identification may be determined in other ways.

If a network authentication service is in place, it may keep a record of IP address assignment-to-unique authentication ID with a start and end time and date. The lookup of the authentication ID may then be done based on the time and date of the packet and the source IP address. If the data has not been updated yet, given possible delay in propagation from authentication, authorization, and accounting (AAA) services, the packet may be queued for future processing.

Part of the information returned from the lookup is the device type: gateway or terminal device. If this is unknown, the TTL (time to live) of the packet may be used to determine if the device is a gateway.

In the case of a user device, such as a mobile phone, the user identifier will be returned. If the IP address is authenticated but there is no user identifier, as may be the case for a first-time lookup, one will be assigned by the service.

In the case of a gateway, a list of user identifiers may be returned with associated fingerprints 222 and/or third-party identifiers 224. Third-party identifiers 224 may be assigned by other services, such as social media sites, search engines, e-commerce sites, and so on, for purposes specific to those services. Third-party identifiers 224 can be obtained by querying a third-party database that maintains identifiers for various users (e.g., Facebook ID, Trade Desk Unified ID 2.0). This will enable the user resolver agent 212 to determine which device is being used and select the right user identifier by matching a fingerprint or third-party identifier against a list of known ones. If the fingerprint does not exist, a new User identifier will be assigned and linked to the fingerprint and all captured third-party identifiers.

If the network operator cannot or is unwilling to provide access to AAA information, the agent will fall back to using third-party IDs. It will request a lookup of the user identifier based on the collection of third-party IDs and the fingerprint in the packet. If multiple IDs are returned it will use the most matches first, followed by the one linked to the highest priority third-party ID followed by the fingerprint. If no matches are returned, then a new user identifier may be generated, assigned to the present packet, and attached to all other identifiers found for the packet.

In the event that none of the preceding strategies is able to find a match, the user resolver agent 212 may use a device fingerprint alone to perform the lookup. If the lookup returns a match, then the matched user identifier will be used. If not, a new user identifier may be generated and linked to the fingerprint.

A fingerprint 222 may be created from a collection of information that, collectively, can be used to statistically identify a user. This could include location information, device type or manufacturer or characteristic, such as screen resolution, installed software, etc. When this information in taken together as a whole, it can be used to create a unique key that may be considered a deterministic identifier and used in the same manner as above.

It should be noted that a lookup service 220 should be configured to handle very high request volumes and, while the agents 202, 210, 212 can be distributed across as many servers as needed to scale to demand, the lookup service will need to operate on a single, large dataset. To this end, the data need to be distributed based on each lookup key (user identifier, IP address, each third-party ID, and device fingerprints) and further distributed based and breaking the indexes into separate datastores based on a sharding strategy known to all the clients.

In any event, the user resolver agent 212 either directly obtains 230 the user identifier 214 from log data 206 or derives 232 the user identifier 214 from a lookup service 220 that references the log data 206, hardware/software fingerprints 222, and/or third-party identifier 224

Identity Graph Creation and Management

The computing device 110 may update, and if necessary first create, an identity graph 218 of the user associated with the user identifier 214. The identity graph 218 may be updated 234 based on the category 208 of content that was the subject of the analyzed data packet 204.

In general, an identity graph 218 tracks accesses to different categories of content by an associated user device. For example, a count of accesses may be stored in a sparse matrix against the destination category and tracked based on chronology, i.e., the date and time of access. As discussed below, identity graphs 218 are used to create and update cohorts.

In order to facilitate a sufficient understanding of usage patterns, data may be collected against a number of dimensions. Counts of accesses by category may be indexed against user identifier as well as the time of day and number of days since the system epoch.

An identity graph 218 may also contain relatively static information such as income level, gender, address, location, jurisdiction, mobile balance, etc. These attributes may be stored on the identity graph as fixed attributes and not based on date and time.

An example of an identity graph 218 entry for user identifier "1234" represented as JSON data is as follows:

```
1234: {
    last_update: "2021-01-01 24:24:24",
    gender: "male",
    income: 83123,
    city: "Toronto",
    mobile_balance: 50,
    access_by_day_and_hour: {
        4125: {
            10: {
                cars: 21,
                travel: 52
            },
            21: {
                video_gaming: 33
            }
        }
    }
}
```

In this example, user "1234" on day "4125" at ten in the morning engaged with car-related content 21 times and travel-related content 52 times. Then, at nine in the evening, the user engaged with video game related content 33 times.

Tracking information this way allows for personal mapping to be based on the time of day, day of week, season, or any other time relevant dimension. It also allows for mapping of less dynamic attributes such as city and gender.

While access information may be updated as the user accesses the hosts 102, static values may require updating as they change in the source systems. This can either be done with a push from the system that owns the data or as a periodic pull of information based on time of last update.

In addition, periodic maintenance of this data may be performed to ensure regulatory compliance and data security. All data in this repository may be encrypted and access to the data may be locked and logged. The computing device 110 may implement a graph manager agent that walks the identity graph database 216 and purges aged information, such as by purging stale user identifiers for lack of activity, updating static data, as well as flagging users that have had statistically relevant network access since the last maintenance cycle for cohort matching.

Cohort Creation and Management

Figure 3:
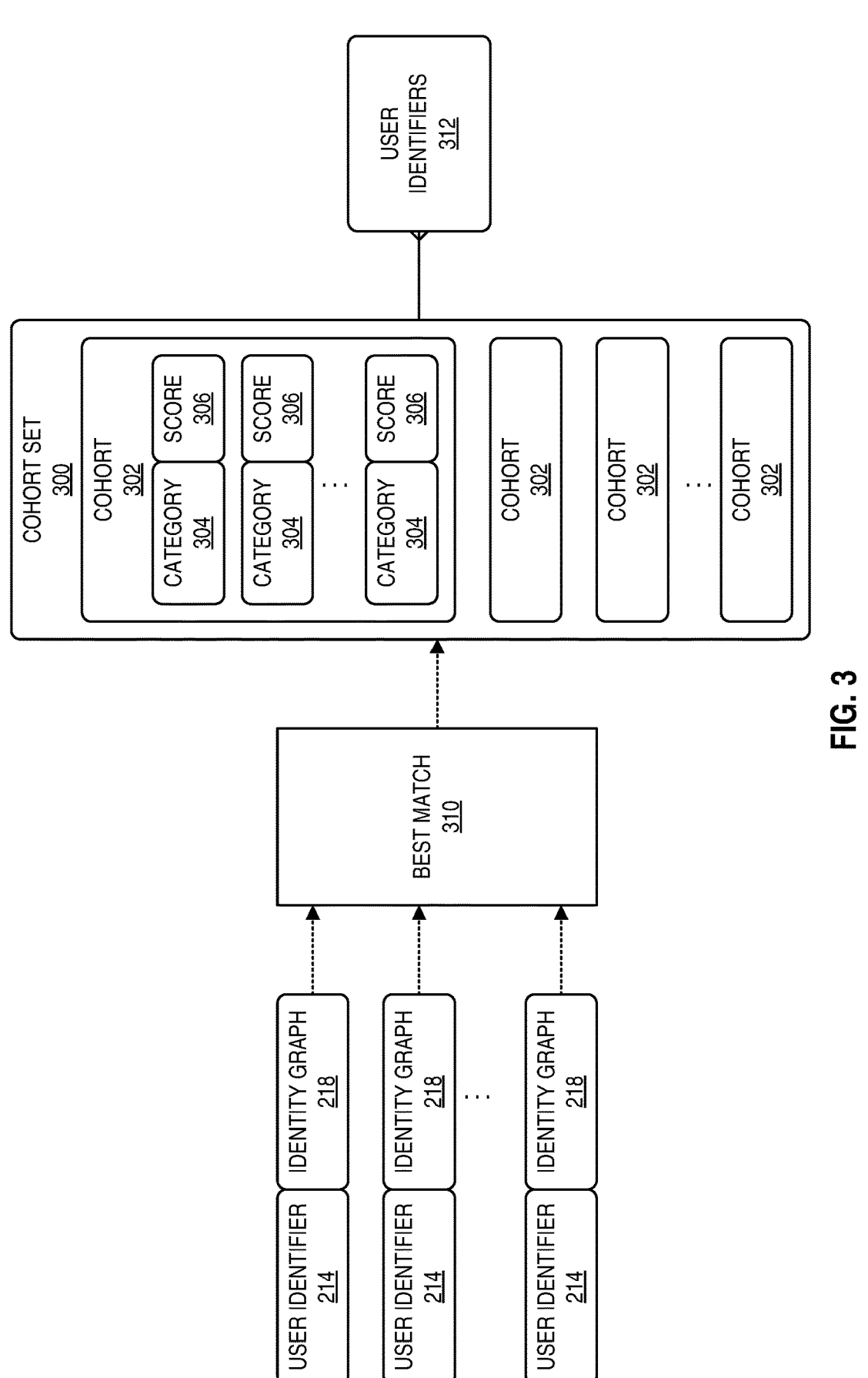
FIG. 3 is a diagram of generating a set of cohorts from identity graphs of users according to the present invention.

With reference to FIG. 3, which illustrates cohort initialization, the computing device 110 (FIG. 1) may be configured to create, update, and manage a set 300 of cohorts 302.

A cohort 302 is a grouping of categories 304 with percentage weights, which may be termed scores 306, assigned to them that reflect a general group of users based on usage behavior. Cohorts 302 are created to normalize the number of views a user has as well as reduce the exposure of personal information to third party systems. Cohorts may be sufficiently general to be effectively anonymous. A specific cohort 302 may include one or more categories 304 and each category 304 may be assigned a decimal value score 306 from 0 to 100 which reflects how likely a user assigned to that cohort is interested in content of a specific category.

Categories may be based on user interests, such as hobbies, sports, shopping, etc. For example, a category may indicate that a user enjoys sports. Categories may additionally or alternatively be based on user privacy and/or compliance with local laws and practices. For example, a category may indicate a request for privacy, a request to block ads, or a request to avoid the sharing of personal information.

Regarding aligning users to cohorts, a user who visited "car" sites 1,000 times in the past day and "travel" sites 500 times would be associated to the same cohort as a user who only visited "car" sites 100 times and "travel" sites 50 times. Both are twice as likely to be interested in "car" content over "travel" content. However, if the second user also visited "video game" content 200 times and the first not at all the two users would end up in different cohorts. In various examples, a user's identifier is associated with only one cohort.

A user's location or preferences may also inform the cohort to which the user belongs. For example, a user may affirm a preference to not be tracked or to be tracked in a limited way. This expression may be expressed by way of a high value in a respective category. A sufficiently high value in this category may cause the user to be assigned to a respective cohort that is not tracked or has limited tracking. The same applies if the user's location requires no or limited tracking, whether the location is provided by the user or informed by the user's particular ISP.

When the system is first launched on a new network there will be no cohort information. Therefore, bootstrap packet data may be captured to create and initialize the cohorts. Additionally, there will be no outcome data so the initial set of cohorts 302 may be created by a n-space best match algorithm 310 to the identity graphs 218 assuming a fixed number of cohorts 302, such as 100, 200, 1000, and so on. The user identifiers 214 associated with the identity graphs 218 may be preserved and associated with the set 300 of cohorts 302, as user identifiers 312. Alternatively, the user identifiers 312 associated with the cohorts 302 may be different from the user identifiers 214 associated with the identity graphs 218 and a relationship, such as a direct mapping, may be maintained.

Figure 4:
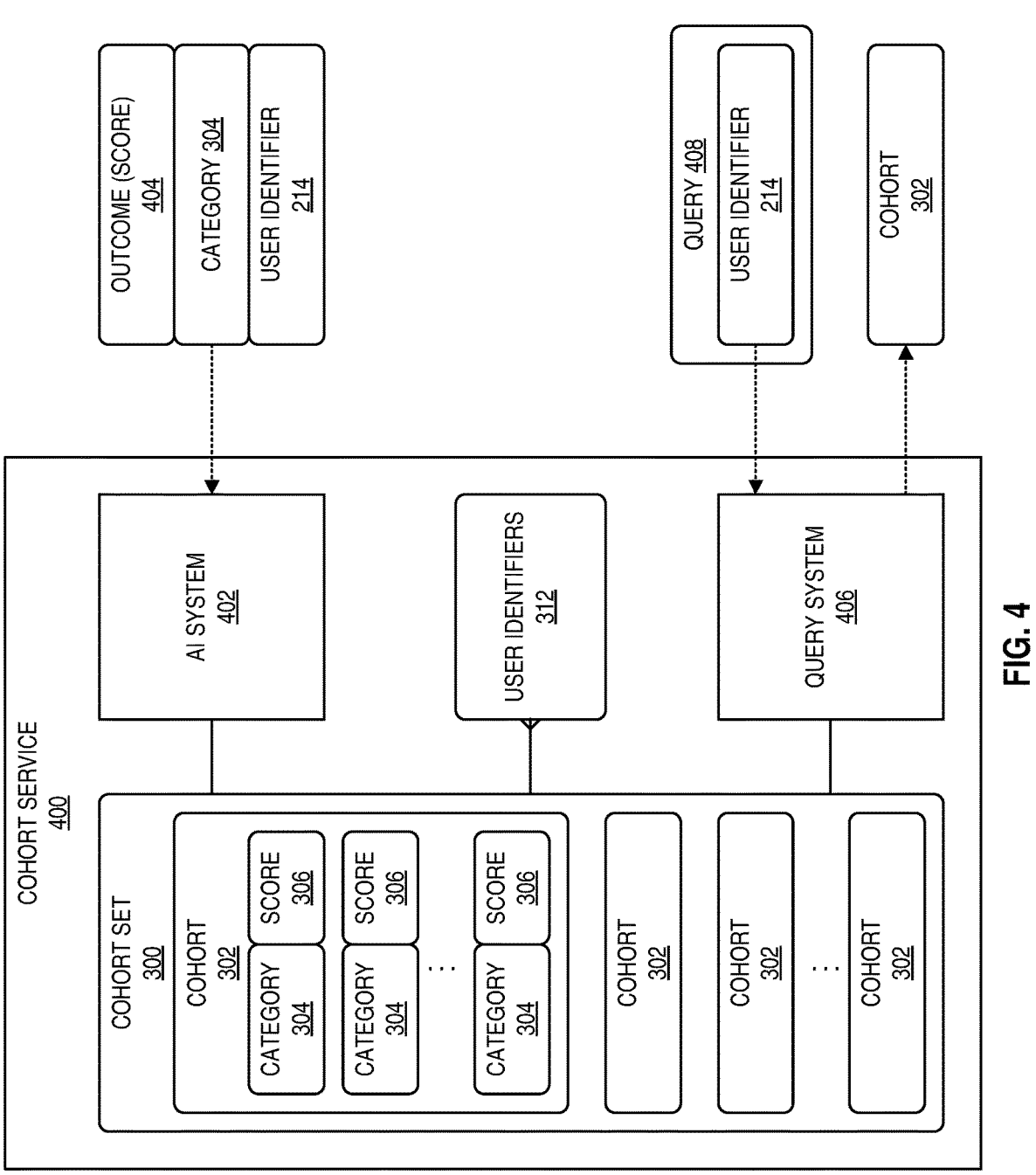
FIG. 4 is a diagram of a cohort service configured to update, create, and query cohorts according to the present invention.

Once the initial set of cohorts are defined, as shown in FIG. 4, the set 300 of cohorts 302 may be loaded into a cohort service 400 with associated unique identifiers 312. The cohort service 400 may be executed by the computing device 100 (FIG. 1). Each of the user identifiers may be linked to a cohort through a user identifier-to-cohort identifier index. The cohort service 400 may allow for scaling in a similar fashion to the previous identity graph service using distributed indexes and sharding to facilitate scaling.

Once the initial cohorts are loaded into the central store, identity cohorts are created and linked to the unique identifier. These identities can then be used for targeting relevant content to the device based on ongoing activity.

The cohorts 304 may be established based on any one or more of the following:

1. Compatibility based on moving averages of attributes (last day, last week, last month, etc.)
2. Compatibility based on time of day
3. Compatibility based on campaign attribute mapping to user attribute mapping
4. Compatibility based on number of views 5. Compatibility on duration and volume of data consumed
6. Rule-based system to augment data based on extended identity information such as geographical region or device balance Creation of new cohorts 302 and updating of existing cohorts 302 can be performed using an AI system 402 and outcome data. Outcome data may include an outcome 404 as related to user identifier 218 and category 304 as a percentage score provided by the third-party system that facilitate the outcome. An outcome score represents how well the user responded to a specific category. For example, if a user clicks but does not purchase the score may be 50 in a decimal range of 0-100. If the user only watches 1 minute of a 3-minute video the score might be 30.

Besides those already mentioned, examples of outcomes 404 that may be tracked include a sale of a good or service (i.e., e-commerce outcomes), following a hyperlink, engaging with content (e.g., watching a video or portion thereof, listening to a song or portion thereof, etc.), viewing an advertisement, creating or renewing a subscription, and creating or logging into an account.

With this outcome data, the AI system 402 can be trained to create new cohorts 302 that have a higher chance of matching against the user preferences. The AI system 402 can also match users with cohorts that more accurately align with their preferences. This process can be run as often as desired and re-alignment or update may be more frequent activity (e.g., daily), while cohort re-construction may be less frequent (e.g., weekly or monthly).

Rule Management and Content Recommendation

With reference to FIG. 4, the set 300 of cohorts 302 is queryable via the cohort service 400 to determine a particular cohort 302 to which a particular user identifier 218 belongs to enable delivery of content associated with the particular cohort 302 to the particular user represented by the particular user identifier 218.

The cohort service 400 may include a query system 406 to receive and respond to queries 408. An example query specifies a user identifier 218 and requests the cohort 302 to which the user belongs.

Once a cohort 302 has been retrieved for a user, it can be used in the content selection process. Content, in general, may have weightings against the same categories as the cohorts 302. The process for determining which content would be most appropriate is to order the content based on which content is best suited for each cohort.

The computing device 110 may further implement a requesting agent that processes query results to obtain categories 304 from cohorts 302 to specify which content categories should be provided to the user who formed the basis for the query. The requesting agent may further request the content to deliver to the user and provide the content to the ISP 108 or other system to actually deliver the content to the user (e.g., by inserting an advertisement into a webpage). A top number of entries for that cohort may be selected without duplicating the same content more than once. In other examples, the category data from a cohort 302 that is the result of a query 408 may be provided to the party making the query 408 for such party to reference when delivering content to the user.

In addition, attributes can still be used to drive specific content with rules. Rules come before cohort content selection and can override the content delivery by specifically selecting content based on targeted attributes.

Cohort Requests and Outcome Tracking

The cohort service 400 may provide multiple interfaces for requesting cohort information and reporting outcomes. Requests can also originate from multiple sources such as clients and/or server solutions. While the type of interface is flexible, it is contemplated that RESTful calls would be particularly useful.

To request cohort information, a call may be made to the query system 406. In general, the query 408 may contain a subset of the identity information identified above, such as:

Device IP Address

User identifier 218

Operating System and version

Device Type

Display Attributes

Third-party Unique Identifiers

If the user identifier 218 is not provided, then the lookup service 220 (FIG. 2) may be used to determine the user identifier 218.

This call can be made from a browser, client application or content server and will result in a response that includes the cohort information and the user identifier. Based on this information the requesting system can make a determination about what content to display.

Once the content control system has used this information to deliver content, it will track the effectiveness of the recommendation and return the data to the platform through a follow up call. This call will return the user identifier, the category of the content delivered and the outcome score. The score will be calculated as described above.

Advantages

The techniques discussed above do not require any participation from the end user or installed software on the user's device. This represents a passive approach to user tracking and behavior forecasting. Results are accurate regardless of the device that is used or the software the end user installs on those devices. Moreover, the approach may be implemented to respect privacy and local laws and practices concerning tracking. These techniques also provide networking intelligence on all access regardless of the application allowing for tracking of content access or programmatic interfaces such as with Internet-of-Things (IoT) devices.

The invention claimed is:

1. A non-transitory machine-readable medium comprising instructions that, when executed by a processor, cause the processor to:

intercept a data packet in transit between a user device and a host through an internet service provider (ISP) core network;

assign the data packet to a category of content;

analyze the data packet to obtain a user identifier associated with the data packet, wherein the user identifier uniquely identifies a user of the user device;

update an identity graph of the user based on the category of content, wherein the identity graph tracks accesses to different categories of content by the user device; and create or update a cohort of different users using identity graphs of the different users, wherein the cohort comprises a grouping of categories of content with percentage weights assigned to the categories that reflect a general group of users based on usage behavior and belongs to a set of cohorts that are associated with user identifiers, the set of cohorts being configured to be queried using a particular user identifier to return a particular cohort corresponding to the particular user identifier, wherein the set of cohorts enables determining the particular cohort to which the particular user identifier belongs to enable delivery of content associated with the particular cohort to a particular user represented by the particular user identifier.

2. The non-transitory machine-readable medium of claim 1, wherein the instructions are to update the cohort by applying the identity graphs to an artificial intelligence system.

3. The non-transitory machine-readable medium of claim 1, wherein the instructions are to create the cohort by applying the identity graphs to an artificial intelligence system.

4. The non-transitory machine-readable medium of claim 1, wherein the instructions are to:

determine outcomes of communications between the different user devices and different hosts; and update the cohort or create a new cohort by applying the identity graphs and the outcomes to an artificial intelligence system.

5. The non-transitory machine-readable medium of claim 4, wherein the outcomes include one or more of:

a sale of a good or service;

following a hyperlink;

engaging with content;

viewing an advertisement;

creating or renewing a subscription; and creating or logging into an account.

6. The non-transitory machine-readable medium of claim 1, wherein the instructions are to obtain the user identifier of the data packet by:

extracting the user identifier from the data packet; or selecting the user identifier from a set of user identifiers using identifying information in the data packet.

7. The non-transitory machine-readable medium of claim 6, wherein the identifying information includes one or more of:

an internet protocol (IP) address;

a third-party user identifier;

a hardware identifier of the user device; and a fingerprint of the user device.

8. The non-transitory machine-readable medium of claim 1, wherein the instructions are to assign the data packet to the category of content by categorizing content at a host that is associated with the packet.

9. A computing device comprising the non-transitory machine-readable medium of claim 1 and a processor to execute the instructions.

10. A method comprising:

intercepting a data packet in transit between a user device and a host through an internet service provider (ISP) core network;

assigning the data packet to a category of content;

analyzing the data packet to obtain a user identifier associated with the data packet, wherein the user identifier uniquely identifies a user of the user device;

updating an identity graph of the user based on the category of content, wherein the identity graph tracks accesses to different categories of content by the user device; and creating or updating a cohort of different users using identity graphs of the different users, wherein the cohort comprises a grouping of categories of content with percentage weights assigned to the categories that reflect a general group of users based on usage behavior and belongs to a set of cohorts that are associated with user identifiers, the set of cohorts being configured to be queried using a particular user identifier to return a particular cohort corresponding to the particular user identifier, wherein the set of cohorts enables determining the particular cohort to which the particular user identifier belongs to enable delivery of content associated with the particular cohort to a particular user represented by the particular user identifier.

11. The method of claim 10, further comprising updating the cohort by applying the identity graphs to an artificial intelligence system.

12. The method of claim 10, further comprising creating the cohort by applying the identity graphs to an artificial intelligence system.

13. The method of claim 10, further comprising:

determining outcomes of communications between the different user devices and different hosts; and updating the cohort or creating a new cohort by applying the identity graphs and the outcomes to an artificial intelligence system.

14. The method of claim 10, further comprising obtaining the user identifier of the data packet by:

extracting the user identifier from the data packet; or selecting the user identifier from a set of user identifiers using identifying information in the data packet.

15. A computing device configured to perform the method of claim 10.

* * * * *